US012727048B2

(12) United States Patent
Lonaeus et al.

(10) Patent No.: US 12,727,048 B2
(45) Date of Patent: Sep. 1, 2026

(54) MULTI-PROTOCOL NETWORK CONNECTION RESTORATION

(71) Applicant: Alarm.com Incorporated, Tysons, VA (US)

(72) Inventors: Gustaf Nicolaus Maxwell Lonaeus, Washington, DC (US); Kyle Rankin Johnson, Falls Church, VA (US); Adam Elliot Feinstein, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 359 days.

(21) Appl. No.: 18/525,353

(22) Filed: Nov. 30, 2023

(65) Prior Publication Data

US 2024/0188162 A1 Jun. 6, 2024

Related U.S. Application Data

(60) Provisional application No. 63/429,603, filed on Dec. 2, 2022.

(51) Int. Cl.
*H04W 76/19* (2018.01)

(52) U.S. Cl.
CPC .................................. *H04W 76/19* (2018.02)

(58) Field of Classification Search
CPC .................................................... H04W 76/19
See application file for complete search history.

(56) References Cited

U.S. PATENT DOCUMENTS 6,865,185 B1 3/2005 Patel et al.
6,970,719 B1 11/2005 McConnell et al.
(Continued)

FOREIGN PATENT DOCUMENTS

WO WO 2015175057 11/2015
WO WO 2016180652 11/2016
(Continued)

OTHER PUBLICATIONS

Chen et al., "Power-efficient access-point selection for indoor location estimation," IEEE Transactions on Knowledge and Data Engineering, Jul. 2006, 18(7):877-888.
(Continued)

*Primary Examiner* — Shawn D Miller
(74) *Attorney, Agent, or Firm* — Fish & Richardson P.C.

(57) ABSTRACT

Methods, systems, and apparatus, including computer programs encoded on computer storage media, for or regaining connectivity between devices. One of the methods includes: determining, using network radio data from a network radio for a device that was connected to another device using the network radio, that the device is disconnected from the other device; in response to determining that the device is disconnected from the other device using the network radio, determining configuration data i) for the device ii) that indicates changes to data on the device to cause the device to increase a likelihood of regaining connectivity with the other device using the network radio; and using the configuration data to cause the device to change the data on the device to increase the likelihood of regaining connectivity with the other device using the network radio.

21 Claims, 3 Drawing Sheets

(56) References Cited

U.S. PATENT DOCUMENTS 7,305,240 B2 12/2007 Chou et al.
7,823,199 B1 10/2010 Rathi et al.
8,214,494 B1 7/2012 Slavin
8,626,115 B2 1/2014 Raleigh et al.
8,972,820 B2 3/2015 Hassan et al.
9,026,648 B1 5/2015 Slavin
9,363,690 B1 6/2016 Singh et al.
9,456,331 B2 9/2016 Rayanki et al.
9,456,361 B1 9/2016 Levy et al.
9,692,498 B2 6/2017 Fan et al.
9,781,609 B1 10/2017 Kurtz et al.
9,929,929 B1 3/2018 Slavin
9,948,380 B1 4/2018 Vos et al.
10,057,813 B1 8/2018 Likar et al.
10,419,908 B1 9/2019 Hutz et al.
10,541,902 B1 1/2020 Slavin
10,593,174 B1 3/2020 Yoon
10,897,691 B1 1/2021 Hutz et al.
10,951,507 B1 3/2021 Slavin
11,279,480 B1 3/2022 Rezvani
11,373,514 B2 6/2022 Slavin
11,510,038 B2 11/2022 Hutz et al.
2006/0039313 A1 2/2006 Chou et al.
2006/0246887 A1 11/2006 Barclay et al.
2008/0065752 A1 3/2008 Ch'ng et al.
2008/0076412 A1 3/2008 Khetawat et al.
2009/0196187 A1* 8/2009 Ooba ........................ H04Q 9/02 370/242
2010/0268823 A1 10/2010 Torarp et al.
2011/0320588 A1 12/2011 Raleigh
2012/0215880 A1* 8/2012 Lamba .................. H04L 67/142 709/217
2014/0277854 A1 9/2014 Jones et al.
2014/0370815 A1 12/2014 Elliot
2015/0266577 A1 9/2015 Jones et al.
2015/0304869 A1 10/2015 Johnson et al.
2015/0312774 A1 10/2015 Lau
2016/0028471 A1 1/2016 Boss et al.
2016/0150427 A1 5/2016 Ramanath
2016/0309337 A1 10/2016 Priest et al.
2016/0323760 A1 11/2016 Zhang et al.
2016/0373944 A1 12/2016 Jain et al.
2016/0373963 A1 12/2016 Chechani
2017/0013478 A1 1/2017 Singh et al.
2017/0048789 A1 2/2017 Tan et al.
2017/0078896 A1 3/2017 Kephart, Jr. et al.
2017/0086112 A1 3/2017 Xue et al.
2017/0111102 A1 4/2017 Fan et al.
2017/0279988 A1 9/2017 Tsuchiya
2017/0303138 A1 10/2017 Barmettler et al.
2017/0311127 A1 10/2017 Murphy et al.
2017/0339584 A1 11/2017 Ketonen et al.
2018/0151045 A1 5/2018 Kim et al.
2019/0029056 A1 1/2019 Hor-Lao et al.
2019/0223248 A1 7/2019 Chandran et al.
2019/0312633 A1 10/2019 Nilsson et al.
2019/0334983 A1* 10/2019 Largman ............. H04L 41/0668
2020/0128359 A1 4/2020 Patil et al.
2021/0136545 A1 5/2021 Hutz et al.
2021/0160139 A1 5/2021 Tzoreff et al.
2022/0212793 A1 7/2022 Rezvani
2023/0129846 A1* 4/2023 Pan ....................... H04W 76/19 370/329

FOREIGN PATENT DOCUMENTS

WO WO 2017205314 11/2017
WO WO 2021/259184 A1 12/2021

OTHER PUBLICATIONS support.apple.com, "How to share your Wi-Fi password from your iPhone, iPad, or iPod touch," Apple Inc., Published Date: Sep. 20, 2021, 2 pages.
International Search Report and Written Opinion in International Appln. No. PCT/US2024/81733, mailed on Mar. 12, 2024, 10 pages.
Extended European Search Report in European Appln. No. 23898862.0, mailed on Feb. 25, 2026, 12 pages.

* cited by examiner 102
120
Smart Home System 112
Firmware Data 114
Configuration Data 116
110
108
106
Network Device B 104b
Network Device A 104a
Lost Connectivity!
Ping 118
100

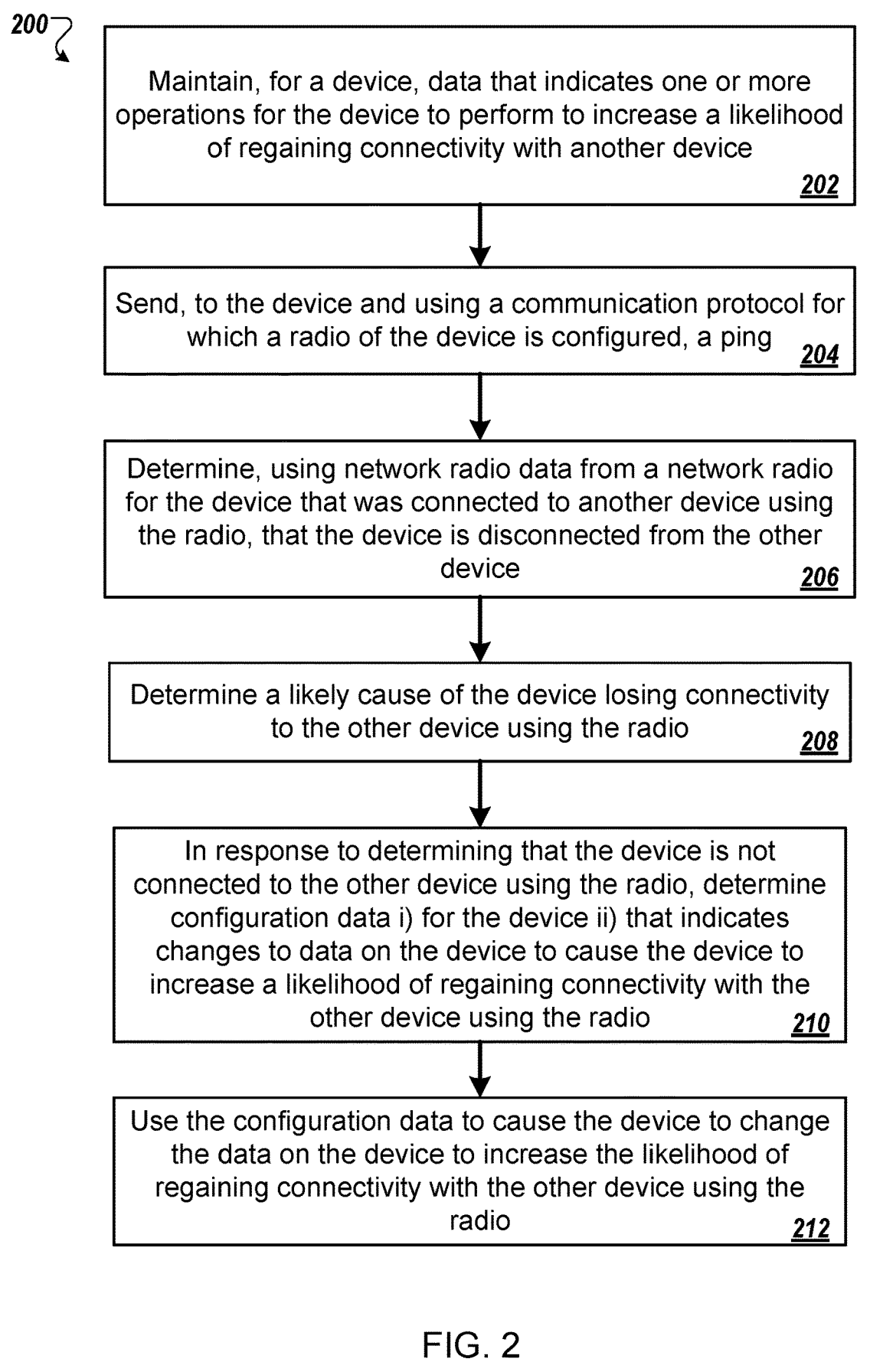

200

Maintain, for a device, data that indicates one or more operations for the device to perform to increase a likelihood of regaining connectivity with another device 202

Send, to the device and using a communication protocol for which a radio of the device is configured, a ping 204

Determine, using network radio data from a network radio for the device that was connected to another device using the radio, that the device is disconnected from the other device 206

Determine a likely cause of the device losing connectivity to the other device using the radio 208

In response to determining that the device is not connected to the other device using the radio, determine configuration data i) for the device ii) that indicates changes to data on the device to cause the device to increase a likelihood of regaining connectivity with the other device using the radio 210

Use the configuration data to cause the device to change the data on the device to increase the likelihood of regaining connectivity with the other device using the radio 212

FIG. 2

MULTI-PROTOCOL NETWORK CONNECTION RESTORATION

CROSS-REFERENCE TO RELATED APPLICATION

This application claims the benefit of U.S. Provisional Application No. 63/429,603, filed on Dec. 2, 2022, the contents of which are incorporated by reference herein.

BACKGROUND

Some smart devices contain more than one type of radio, e.g., a tablet can include both Wi-Fi and Bluetooth radios. Sometimes a device can lose connection over one communication protocol, which can require human intervention to reestablish a connection, e.g., re-authenticate network credentials.

SUMMARY

In smart home systems, devices can have multiple communication protocols, e.g., radios. These devices can lose connectivity for a variety of reasons. For example, a customer replacing or repositioning a router, or the antennas associated with Wi-Fi can interrupt the connection. Additionally, new sources of interference in the smart home system can congest Wi-Fi bands. For Z-Wave and Zigbee devices, replacing the controller, repositioning the controller or end devices in the network, e.g., changing the mesh topology, or new sources of interference can interrupt connectivity. Factory resetting an end device can also cause a loss of network credentials. For long-range (LoRa) devices, the loss of a gateway in the vicinity of an end device or increased congestion of the bands used in LoRa communication can cause a loss of connection. In some instances, bugs in firmware can result in the memory of devices being wiped, leading to the loss of information needed to access the network. Further, unexpected power fluctuations in a smart home system can cause factory resets of devices, and thus the loss of some network information in the end devices. When a connection is lost, reestablishing communication with a device and the rest of network can take a long time, e.g., days, and require human intervention.

Given the multiple communication protocols in certain devices, each of which can use a corresponding radio connection, cross protocol communication can help avoid long or permanent network disconnections. In general, communication protocols do not interfere, e.g., protocols operate within different frequency ranges, to function normally. However, some protocols allow cross communication, such as using Bluetooth to establish Wi-Fi connectivity. The smart home system can periodically and proactively check, for a device registered with the smart home system, if each communication protocol is properly working, e.g., ping the device according to a predetermined schedule. When the smart home system detects that a device is not connected to another device using a radio connection and the corresponding communication protocol, the smart home system can determine network credentials, instructions, or both, for the device that can increase the likelihood of the device regaining connectivity with the other device across the radio connection. In some examples, the device can use firmware data to determine the instructions; send a request to the smart home system for network credentials, instructions, or both; or perform other appropriate actions to increase the likelihood of regaining connectivity with the other device across the radio connection; or a combination thereof.

In general, one innovative aspect of the subject matter described in this specification can be embodied in methods that include the actions of: determining, using network radio data from a network radio for a device that was connected to another device using the network radio, that the device is disconnected from the other device; in response to determining that the device is disconnected from the other device using the network radio, determining configuration data i) for the device ii) that indicates changes to data on the device to cause the device to increase a likelihood of regaining connectivity with the other device using the network radio; and using the configuration data to cause the device to change the data on the device to increase the likelihood of regaining connectivity with the other device using the network radio.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, determining that the device is disconnected from the other device using the network radio includes receiving, from the device and by one or more computers, a message that indicates that the device is disconnected from the other device using the network radio; and using the configuration data includes sending, to the device, the configuration data to cause the device to change the data to increase the likelihood of regaining connectivity with the other device using the network radio.

In some implementations, the method can include sending, to the device and using a communication protocol for which the network radio is configured, a ping. Determining that the device is disconnected from the other device using the network radio can include determining that the device has not responded to the ping within a threshold time period; and using the configuration data includes sending, to the device, the configuration data to cause the device to change the data to increase the likelihood of regaining connectivity with the other device using the network radio.

In some implementations, sending the ping includes sending the ping according to a predetermined schedule, and determining that the device is disconnected includes determining that the device has not responded according to the predetermined schedule.

In some implementations, using the configuration data includes using, by the device, the configuration data to cause the device to change the data to increase the likelihood of regaining connectivity with the other device using the network radio.

In some implementations, the method can include determining a likely cause of the device losing connectivity to the other device using the network radio. Determining the configuration data can use data for the likely cause of the device losing connectivity to the other device using the network radio.

In some implementations, the method can include maintaining, for the device, firmware data that indicates one or more operations for the device to perform to increase a likelihood of regaining connectivity with the other device. Determining the configuration data can use the firmware data.

In some implementations, the method can include, after using the configuration data to cause the device to change the data on the device, determining a connection status between the device and the other device; and performing one or more additional operations using the connection status between the device and the other device.

In some implementations, the method can include sending further configuration data with instructions for generating a message for display in a user interface on the device. The connection status can indicate that the device and the other devices are still disconnected.

In some implementations, performing the one or more additional operations includes: storing, in a database that tracks connection status for various network communication protocols and devices, the connection status that indicates a corresponding network communication protocol for the connection between the device and the other device; and sending, to one or more additional devices that connect with the other device using the corresponding network communication protocol and using data from the database, a network connectivity message.

In some implementations, the method can include sending, to an additional device, the configuration data that caused the device to change the data to cause the additional device to perform an operation using the configuration data.

In some implementations, determining that the device is disconnected from the other device includes determining that the device is unable to send signals to the other device over the network radio.

In some implementations, determining that the device is disconnected from the other device includes determining that the device is unable to receive signals from the other device over the network radio.

In some implementations, determining that the device is disconnected from the other device uses a cross protocol communication mode with the network radio.

The subject matter described in this specification can be implemented in various embodiments and may result in one or more of the following advantages. The disclosed methods can increase connectivity in a smart home system, e.g., increase the likelihood of more devices being connected to each other, the network, or both, at a particular moment. This advantage can be provided by the claim feature of using the configuration data to cause the device to change the data on the device to increase the likelihood of regaining connectivity with the other device using the network radio. When a disconnection does occur, the overall disconnection time can be reduced by using cross protocol communication as described in this specification, e.g., instead of having to troubleshoot a particular protocol stream.

In some implementations, the disclosed systems and methods can provide awareness of network health generally, compared to other systems, since the smart home system can keep a record of disconnections of various protocols, e.g., by recording a connection status between two devices. The recording of the connection status can be in a database. The network health awareness can include access to data indicating which devices are connected, disconnected, or a combination of both, to one or more networks, devices, or both.

In some implementations, the disclosed methods can enhance security of the smart home system by periodically changing credentials related to communication protocols. When the new credentials are determined, the smart home system can provide configuration data to devices connected to the system to cause the respective device to change the credentials to access a network at the property monitored by the smart home system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of a process for regaining connectivity between devices.

Like reference numbers and designations in the various drawings indicate like elements.

DETAILED DESCRIPTION

Figure 1:
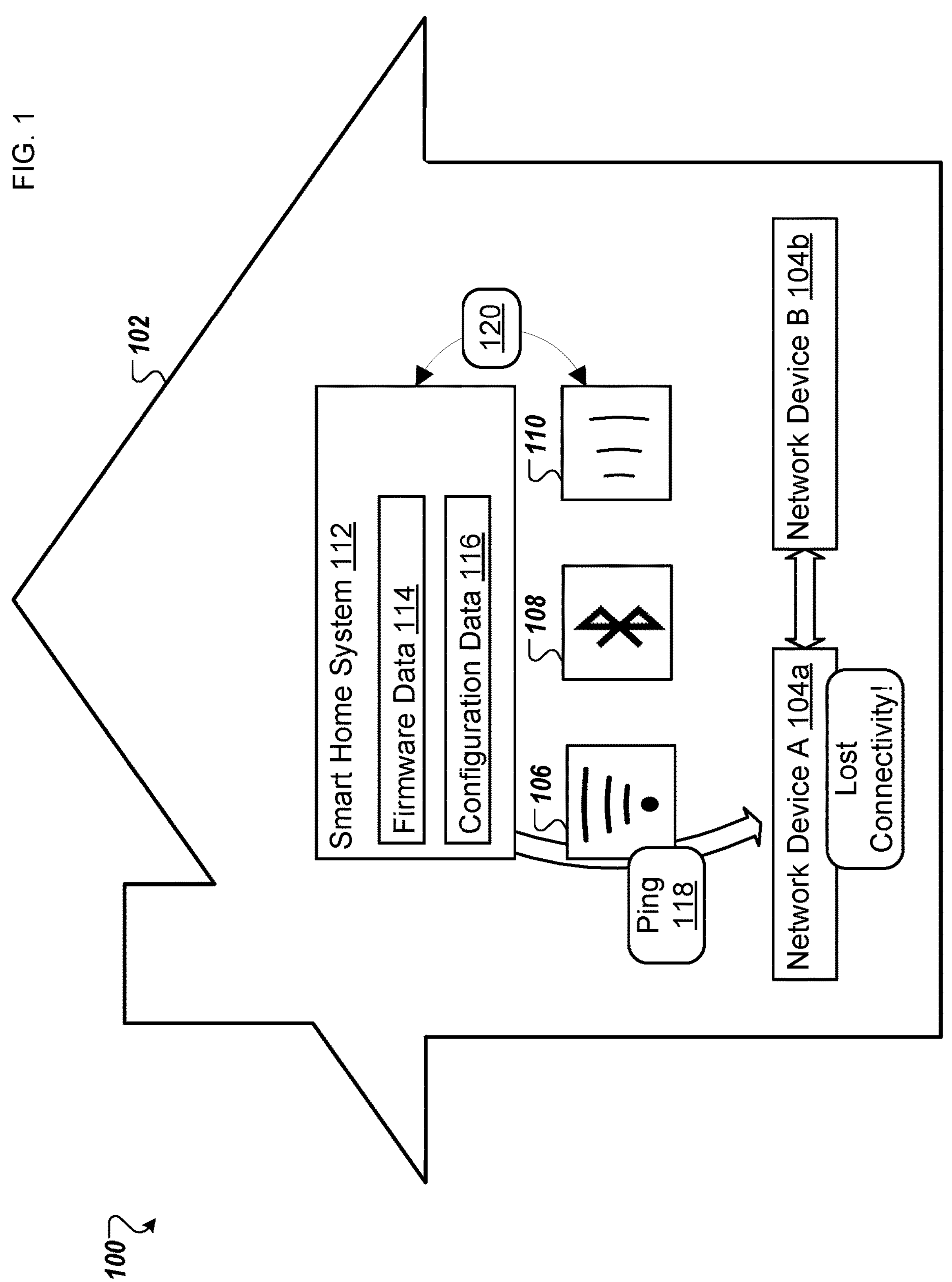
FIG. 1 shows a smart home environment for reestablishing connection between network devices.

FIG. 1 shows a smart home environment 100 for reestablishing connection between network devices. A property 102 can include multiple network devices, e.g., network device A 104*a* and network device B 104*b*, such as cameras, motion sensors, sound sensors, touchscreen tablets, cellular devices, doorbell cameras, and the like. Each network device can include one or more radios that can communicate over communication protocols such as, but not limited to, Wi-Fi, Bluetooth, Long-Range (LoRa), Z-Wave, and Zigbee.

The property 102 can include a smart home system 112 that manages the various network devices and the connections between components in the property 102. The smart home system 112 can include firmware data 114 and configuration data 116. The firmware data 114 can include instructions that increase a likelihood of maintaining and regaining connection between network devices connected to the smart home system 112. For instance, the firmware data 114 can include a firmware update that corrects a network connectivity bug in a corresponding network device A-B 104*a-b*. The smart home system 112 can send firmware data 114 to network device A 104*a* or network device B 104*b* as needed, e.g., when updates are available for the devices, when a device is first installed in the property 102, or both.

The configuration data 116 can include network credentials, such as passwords, service set identifiers (SSID), or both, that allow network device A 104*a*, network device B 104*b*, or both, to establish a connection over available communication protocols. The smart home system 112 can support various types of communication protocols including, but not limited to, Wi-Fi, Bluetooth, Long-Range (LoRa), Z-Wave, and Zigbee. For example, the smart home system 112 in property 102 can communicate over a Wi-Fi communication protocol 106, a Bluetooth communication protocol 108, and a LoRa communication protocol 110 to the network devices, e.g., network device A 104*a* and network device B 104*b*.

Network devices can lose connection over a particular communication protocol for various reasons. In general, the loss of a connection over a particular communication protocol can indicate that the network device, e.g., network device A 104*a*, does not have the appropriate configuration data to establish a connection between the network device and the smart home system 112. In some examples, loss of connection can indicate that a network device has a software bug, e.g., a firmware software bug or a bug in another application executing on the network device. In some implementations, one or more network devices are located outside of property 102 or a building, e.g., home, on the property 102, which can increase the likelihood of connectivity issues.

The smart home system 112 can determine that a network device, e.g., network device A 104*a*, is not connected to another device, e.g., network device B 104*b*. In some implementations, the smart home system 112 can use network radio data for the network device. The network radio data can be an indication that the device can or cannot send signals over a particular communication protocol, which has network radio data and was connected to the other device using the network radio. The indication can indicate that the network device A 104*a* lost connectivity over a communication protocol.

The smart home system 112 can reestablish connectivity over a particular communication protocol between network devices, e.g., network device A 104*a* and network device B 104*b*, by determining the appropriate configuration data 120. The appropriate configuration data 120 can update data on the disconnected device A 104*a*, which can increase the likelihood of the device A 104*a* regaining connectivity with the other network device B 104*b* over the particular communication protocol.

For example, the smart home system 112 can determine that network device A 104*a* is not connected to network device B 104*b* over the Wi-Fi communication protocol 106. Using the configuration data 116, the smart home system 112 can determine the appropriate configuration data 120 for the disconnected network devices. The smart home system 112 can communicate the appropriate configuration data 120 to network device A 104*a* over communication protocol other than the Wi-Fi communication protocol 106 that the network device A 104*a* can support, e.g., the LoRa communication protocol 110.

The network device A 104*a* can use the appropriate configuration data 120 to change data on the network device A 104*a*, which can increase the likelihood of regaining connectivity with the network device B 104*b* over the Wi-Fi communication protocol 106. For instance, the network device A 104*a* can use the configuration data 120 to adjust one or more settings on the network device A 104*a* to increase the likelihood of regaining connectivity.

In some implementations, the smart home system can determine the appropriate configuration data 120 by using one or more tables within the configuration data 116. For example, the series of tables can include unique identifiers for at least one of the network devices connected to the smart home system 112, descriptions of at least one of the network devices connected to the smart home system 112, and the communication protocols supported by individual network devices connected to the smart home system 112. The tables can include information about relevant credentials that can be used to reestablish connectivity for each communication protocol supported by the smart home system 112. For example, for the Wi-Fi communication protocol 106, the tables can include one or more pairings of SSID and passwords. For a Z-wave communication protocol, the tables can include a SmartStart QR code for end devices or Home ID and Network Key information for gateways.

In some implementations, the smart home system 112 can determine the most likely cause for loss of connectivity between network devices. Determining the most likely cause for loss of connectivity between network devices can vary depending on the particular communication protocol. For example, when reestablishing a Wi-Fi connection, the smart home system 112 can check if any of the following have occurred since the last communication between the smart home system 112 and the disconnected network device: the replacement of a router, the repositioning of the router, the repositioning of the router's antennas, the addition of the new source of interference in the property 102, which can congest particular Wi-Fi bands, or a combination of these.

As another example, when reestablishing a Z-wave connection for Zigbee devices, the smart home system 112 can check if any of the following have occurred since the last communication between the smart home system 112 and the disconnected network device: a replacement of a Z-wave or Zigbee controller, the repositioning of the controller or end device connected to the smart home system 112, a factory resetting of an end device, the addition of a new source of interference in the property 102, or a combination of these. As another example, when reestablishing connectivity with a LoRa device, the smart home system 112 can check for a loss of a gateway in the vicinity of the LoRa device, increased congestion on the LoRa bands, or both. In general, the smart home system 112 can look for bugs in firmware data 114 that can result in memory being wiped or loss of some network information. The smart home system 112 can also monitor for unexpected conditions, such as power fluctuations that can cause factory resets on devices and general loss of network information.

The smart home system 112 can use data indicating the most likely cause to determine the appropriate configuration data 120 accordingly. For instance, the tables can indicate different configuration data 120 for different likely causes. The smart home system 112 can use the most likely cause as a key to retrieve the appropriate configuration data 120 from the tables.

The appropriate configuration data 120 can correspond to various types of processes for the disconnected device to attempt to regain connectivity. For example, the appropriate configuration data 120 can cause the disconnected network device to reenter authentication information, undergo a factory reset, to display a message in a user interface that prompts a technician or user to do something, or a combination of these.

In some implementations, the lack of connectivity between two network devices can be unidirectional or bidirectional. For example, a Bluetooth radio on network device A 104*a* can be able to send signals to network device B 104*b* but not receive signals from network device B 104*b*. In such an example, the appropriate configuration data 120 can target data related to the Bluetooth radio's ability to receive signals. In some examples, the smart home system 112 can send different configuration data 120 to each of the network devices A-B 104*a-b* to configure each of the devices respectively.

In some implementations, the smart home system 112 can select from multiple available communication protocols for sending the appropriate configuration data 120 to the disconnected device A 104*a*. For example, if the network device A 104*a* has lost Wi-Fi connectivity with network device B 104*b*, smart home system 112 can determine whether to use the Bluetooth communication protocol 108, the LoRa communication protocol 110, or both. In some implementations, the smart home system 112 can rank which communication protocol is the most appropriate, using information about network congestion in the property 102, connection speeds, bandwidth, latency, and the general status of the various communication protocols, a cost to a user for sending data over the selected communication protocol, historical data of the performance of a communication protocol, e.g., the LoRa communication protocol 110 has historically dropped data packets, so it would have a lower ranking, or a combination thereof.

In some implementations, the smart home system 112 does not immediately communicate the appropriate configuration data 120 to the disconnected network device. Instead, the smart home system 112 can maintain the appropriate configuration data 120 to be shared at a later time. In such implementations, the smart home system 112 can use a single communication protocol, since the appropriate configuration data 120 can be sent over the problematic communication protocol at a later time when connection is restored. The smart home system 112 can use these implementations when a network device has only a single radio. The smart home system 112 can determine that the network device has only a single radio and then perform this process.

In some implementations, the smart home system 112 experiences disconnections over multiple communication protocols. For example, a power outage in the property 102 can cause the radio on network device A 104*a* to lose Wi-Fi and Bluetooth capabilities and the radio on network device B 104*b* to lose Bluetooth and LoRa capabilities. The appropriate configuration data 120 can include data related to multiple communication protocols, e.g., Wi-Fi, Bluetooth, and LoRa, for multiple devices. The devices can then share the appropriate configuration data 120 using the still functional radios, e.g., the LoRa radio for network device A 104*a* in the Wi-Fi radio for network device B 104*b*.

In order to avoid challenges associated with the lack of connectivity between network devices, e.g., a user discovering a communication protocol is not available or a network connection being down for an extended period of time, the smart home system 112 can proactively send a ping 118 over a communication protocol, e.g., Wi-Fi communication protocol 106, to the network devices, e.g., network device A 104*a*, to determine whether the network devices lost connectivity.

In some implementations, the smart home system 112 periodically sends a ping 118 to one or more network devices on the order of seconds, minutes, or hours, e.g., every four, eight, or twelve hours. The frequency of the pings 118 can be network device, communication protocol, or both specific. For example, the smart home system 112 can ping network device A 104*a* over the Wi-Fi communication protocol 106 every four hours, network device A 104*a* over the Bluetooth communication protocol 108 every eight hours, and network device B 104*b* over the Bluetooth communication protocol 108 every twelve hours.

In some implementations, the frequency of a ping 118 can depend on the importance of detecting a problem, e.g., as rated by the smart home system 112 or by user, the network congestion of the particular communication protocol, battery life of the recipient network device, the number of network devices in the smart home system 112, or a combination thereof. For example, to preserve a global ping rate, e.g., 1 ping per second (ping/s), one device can send 1 ping/s, or two devices could send at 0.5 pings/s.

If a network device does not respond to a ping 118 within a threshold time period, the smart home system 112 can determine that the network device has likely lost connectivity over a particular communication protocol. For example, the smart home system 112 can ping network device A 104*a* using the Wi-Fi communication protocol 106. If the network device A 104*a* does not respond within a threshold time period, e.g., one second, the smart home system 112 can determine that the network device A 104*a* has lost Wi-Fi connectivity.

The previous examples mention determining that a device, e.g., network device A 104*a*, is not connected to another device, e.g., network device B 104*b*. However, the disclosed techniques can apply for determining that the device is disconnected from the other device as well, e.g., that the two devices were once connected and have lost connection.

The smart home system 112 is an example of a system implemented as computer programs on one or more computers in one or more locations, in which the systems, components, and techniques described in this specification are implemented. The network devices, e.g., network device A 104*a* and network device B 104*b*, may include personal computers, mobile communication devices, and other devices that can send and receive data over a network. The network (not shown), such as a local area network ("LAN"), wide area network ("WAN"), the Internet, or a combination thereof, connects the network devices, user devices, and the servers. The smart home system 112 may use a single server computer or multiple server computers operating in conjunction with one another, including, for example, a set of remote computers deployed as a cloud computing service.

The smart home system 112 can connect to several different functional components, can include one or more data processing apparatuses, can be implemented in code, or a combination of both. For instance, each of the different functional components can include one or more data processors and instructions that cause the one or more data processors to perform the operations discussed herein.

The various functional components of the smart home system 112 and its connected components may be installed on one or more computers as separate functional components or as different modules of a same functional component. For example, the components can be implemented as computer programs installed on one or more computers in one or more locations that are coupled to each through a network. In cloud-based systems for example, these components can be implemented by individual computing nodes of a distributed computing system.

FIG. 2 is a flow diagram of a process 200 for regaining connectivity between devices. For example, the process 200 can be used by the smart home system 112 from the smart home environment 100.

A smart home system 112 can maintain, for a device, data that indicates one or more operations for the device to perform to increase a likelihood of regaining connectivity with another device (202). The data can be configuration data, such as firmware data. For example, the smart home system 112 can maintain firmware data 114 for network device A 104*a* with a Wi-Fi radio, the firmware data including instructions for reestablishing Wi-Fi connectivity between network device A 104, network device B 104*b*, or both, or instructions for a software update that will increase the likelihood of regaining connectivity.

The smart home system 112 can send, to the device and using a communication protocol for which a network radio of the device is configured, a ping (204). For example, the smart home system 112 can ping network device A 104*a* over the Wi-Fi communication protocol 106.

The smart home system 112 can determine, using network radio data from a network radio for the device that was connected to another device using the radio, that the device is disconnected from the other device using the radio (206). In some implementations, the other device is the main device that implements the smart home system 112, e.g., network device B 104*b*.

In some implementations, determining that the device is disconnected from the other device using the network radio can include determining that the device has not responded to the ping within a threshold time period. For example, the smart home system 112 can use network radio data, e.g., data indicating no response to the ping, that network device A 104*a* is not connected over Wi-Fi. This can include determining that the network device A 104*a* is not connected to the network device B 104*b* over Wi-Fi.

In some implementations, determining that the device is disconnected from the other device using the network radio can include receiving a message that indicates that the device is not connected to the other device using the network radio. In such implementations, the smart home system 112 can determine that certain devices are not connected without the use of the ping 118. The smart home system 112 can receive the message from the other network device B 104*b*, another device associated with the smart home system 112, e.g., a device operated by a person at the property, or another appropriate device.

The smart home system 112 can determine a likely cause of the device losing connectivity to the other device using the radio (208). In some implementations, determining the likely cause can include checking the status, e.g., the connection status, of various components connected to the smart home system 112. The smart home system 112 can store data for the connection status in a database, e.g., that tracks connection status for various network communication protocols and devices. In some examples, the database can track disconnections for various connections.

In response to determining that the device is disconnected from the other device using the radio, the smart home system 112 can determine configuration data i) for the device ii) that indicates changes to data on the device to cause the device to increase a likelihood of regaining connectivity with the other device using the radio (210).

In some implementations, determining the configuration data uses data for the likely cause of the device losing connectivity to the other device using the radio, the firmware data, a ranking system for selecting the network radio data, or a combination of these.

The smart home system 112 can use the configuration data to cause the device to change the data on the device to increase the likelihood of regaining connectivity with the other device using the radio (212). In some implementations, using the configuration data can include sending, to the device, the configuration data to cause the device to change the data to increase the likelihood of regaining connectivity with the other device using the network radio.

In some implementations, using the configuration data can include using, by the device, the configuration data to cause the device to change the data to increase the likelihood of regaining connectivity with the other device using the network radio.

In some implementations, the process 200 can include additional steps, fewer steps, or some of the steps can be divided into multiple steps. For example, steps 202, 204, 208, or a combination of these, can be optional.

In some implementations, the smart home system 112 can record the connection status of various devices, e.g., whether a device is not connected to another device, which can allow the smart home system 112, a user, or both, to keep track of the overall network health of the smart home system 112. The smart home system 112 can use the status of the various devices to request updates to, maintenance for, or both, devices that have a disconnection rate that satisfies a threshold.

The following scenarios can provide examples of additional steps or dividing steps into multiple steps.

In a first scenario, a device has both Wi-Fi and LoRa radios. The smart home system 112 can ping the device through both the Wi-Fi communication protocol 106 and the LoRa communication protocol 110. The Wi-Fi connection can be down, and consequently, the device does not respond to the ping sent over Wi-Fi, though it does respond to the ping sent over LoRa.

The smart home system 112 can scan a table within configuration data 116 for Wi-Fi credentials for the device. If the tables include the relevant Wi-Fi credentials, the smart home system 112 can send the relevant Wi-Fi credentials to the device using the LoRa radio. If, however, the table does not include relevant credentials, the smart home system 112 can scan for additional credentials, e.g., the 5 GHz SSID of the same Wi-Fi network, and continue with sending the additional credentials to the device.

Continuing with the first scenario, if neither the relevant nor the additional credentials help to reestablish the Wi-Fi connection, the smart home system 112 can determine to reconfigure the Wi-Fi bands used by the device while using the last known authentication credentials. The appropriate configuration data 120 can include instructions about the reconfiguration of the Wi-Fi bands, and the smart home system 112 can send the appropriate configuration data 120 to the device over LoRa. Then, in response to receiving instructions within the appropriate configuration data 120, the device can cycle through possible Wi-Fi bands.

If the above approaches still do not reestablish connection in the first scenario, the smart home system 112 can perform additional operations. For example, the smart home system 112 can determine to send configuration data with instructions for generating a message for display in the user interface on the device. The message can prompt a user to give input regarding the possible cause for loss of Wi-Fi connectivity. In some implementations, after receiving user input, part of the process 200 can restart.

In a second scenario, a device can have both Z-wave and Wi-Fi radios. The smart home system 112 can ping the device using both Z-wave and Wi-Fi. The smart home system 112 can determine that Z-wave communication is down if the device does not respond to the ping over Z-wave, but does respond to the ping sent over Wi-Fi. The smart home system 112 can scan a table within the configuration data 116, looking for Z-wave credentials. The smart home system 112 can find the appropriate SmartStart QR code for the device and that the device supports Z-Wave long range communication.

The smart home system 112 can determine appropriate configuration data 120, which includes instructions for the Z-wave radio on the device to reset network settings. The smart home system 112 can transmit the appropriate configuration data 120 to the device over Wi-Fi. In response to receiving the appropriate configuration data 120, the device can attempt to join controllers in the property 102. If one of the controllers in the property 102 detects the Z-wave long range request to join the network, then that controller can initiate the process of reestablishing connectivity.

In some implementations, the process 200 can help reestablish connection between devices when a user has changed the password relating to one of the communication protocols supported by the smart home system 112. For example, if a user changes the Wi-Fi password while using one device, e.g., network device B 104*b*, another device, e.g., network device A 104*a*, can lose Wi-Fi connectivity. Instead of the user having to update the Wi-Fi password on every device connected to the smart home system 112, the smart home system 112 can proactively share the new Wi-Fi password by sending the appropriate configuration data 120 to the other devices using a different communication protocol. For example, after connectivity has been reestablished between two devices, the smart home system 112 can preemptively send the configuration data that was shared between two devices to a third device. Then the third device can perform an operation using the configuration data, e.g., update network credentials. The smart home system 112 can determine the third device using the database that tracks the connection status for various network communication protocols and devices.

In some implementations, the process 200 can be used to enhance security of the smart home system 112. For example, a user can permit the smart home system 112 to periodically change credentials associated with various communication protocols. Similarly to the example above, the smart home system 112 can share the updated credentials to devices connected to the smart home system 112 without any user engagement.

In some implementations, the smart home system 112 can detect a power outage in the property 102, that a router is down, other problems that generally affect the smart home system 112, or combination thereof. In cases where a disconnection between the smart home system 112 and a network device is due to an issue that is not specific to the network device, the smart home system 112 can determine to skip determining, using, or both, the configuration data.

For situations in which the systems discussed here collect personal information about users, or may make use of personal information, the users may be provided with an opportunity to control whether programs or features collect personal information (e.g., information about a user's network credentials, a user's preferences, or a user's current location), or to control whether and/or how to receive content from the content server that may be more relevant to the user.

Figure 3:
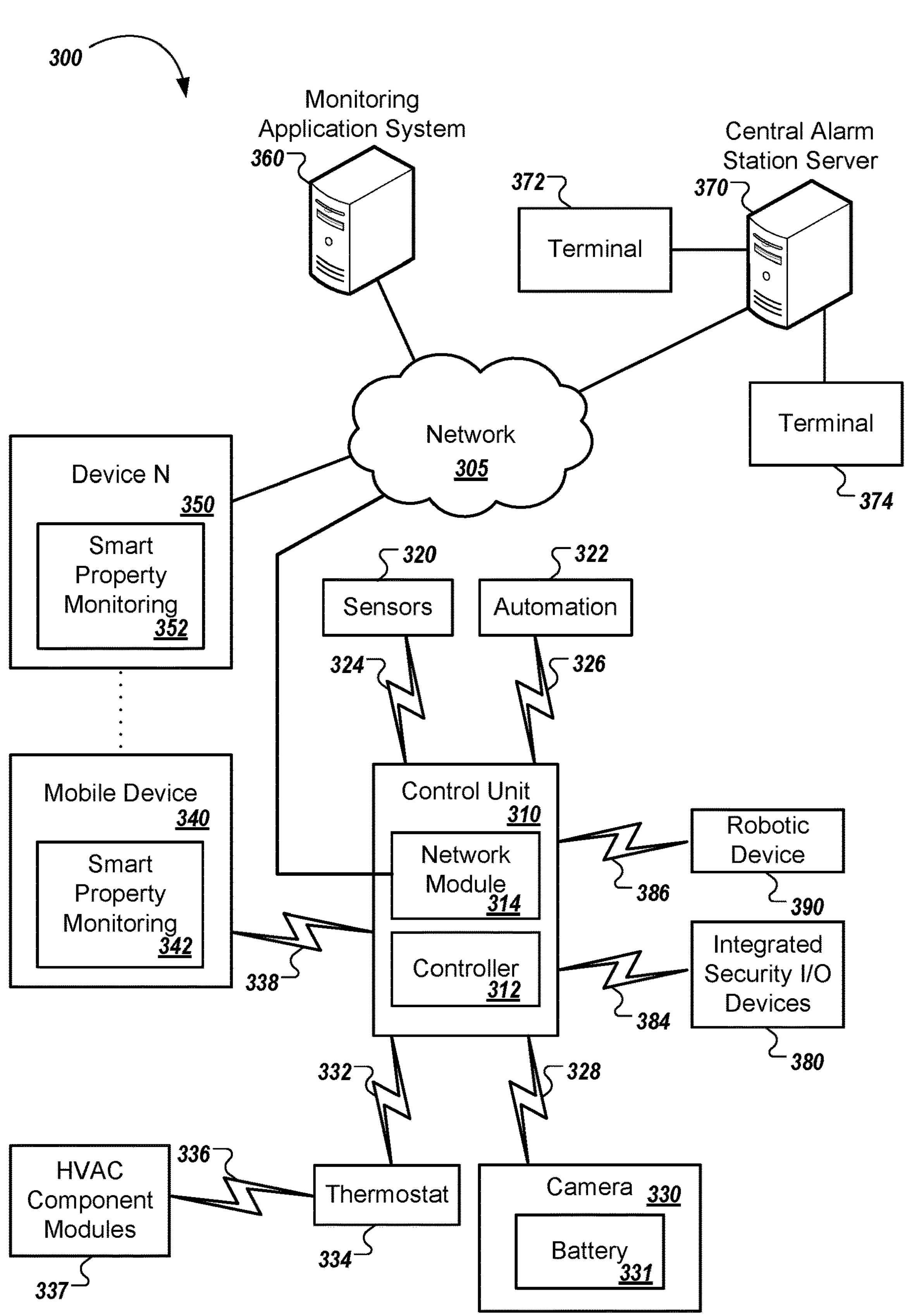
FIG. 3 is a diagram illustrating an example of a property monitoring system.

FIG. 3 is a diagram illustrating an example of an environment 300, e.g., for monitoring a property. The property can be any appropriate type of property, such as a home, a business, or a combination of both. The environment 300 includes a network 305, a control unit 310, one or more devices 340 and 350, a system 360, a central alarm station server 370, or a combination of two or more of these. In some examples, the network 305 facilitates communications between two or more of the control unit 310, the one or more devices 340 and 350, the system 360, and the central alarm station server 370.

The network 305 is configured to enable exchange of electronic communications between devices connected to the network 305. For example, the network 305 can be configured to enable exchange of electronic communications between the control unit 310, the one or more devices 340 and 350, the system 360, and the central alarm station server 370. The network 305 can include, for example, one or more of the Internet, Wide Area Networks ("WANs"), Local Area Networks ("LANs"), analog or digital wired and wireless telephone networks (e.g., a public switched telephone network ("PSTN"), Integrated Services Digital Network ("ISDN"), a cellular network, and Digital Subscriber Line ("DSL")), radio, television, cable, satellite, any other delivery or tunneling mechanism for carrying data, or a combination of these. The network 305 can include multiple networks or subnetworks, each of which can include, for example, a wired or wireless data pathway. The network 305 can include a circuit-switched network, a packet-switched data network, or any other network able to carry electronic communications (e.g., data or voice communications). For example, the network 305 can include networks based on the Internet protocol ("IP"), asynchronous transfer mode ("ATM"), the PSTN, packet-switched networks based on IP, X.25, or Frame Relay, or other comparable technologies and can support voice using, for example, voice over IP ("VOIP"), or other comparable protocols used for voice communications. The network 305 can include one or more networks that include wireless data channels and wireless voice channels. The network 305 can be a broadband network.

The control unit 310 includes a controller 312 and a network module 314. The controller 312 is configured to control a control unit monitoring system, e.g., a control unit system, that includes the control unit 310. In some examples, the controller 312 can include one or more processors or other control circuitry configured to execute instructions of a program that controls operation of a control unit system. In these examples, the controller 312 can be configured to receive input from sensors, or other devices included in the control unit system and control operations of devices at the property, e.g., speakers, displays, lights, doors, other appropriate devices, or a combination of these. For example, the controller 312 can be configured to control operation of the network module 314 included in the control unit 310.

The network module 314 is a communication device configured to exchange communications over the network 305. The network module 314 can be a wireless communication module configured to exchange wireless, wired, or a combination of both, communications over the network 305. For example, the network module 314 can be a wireless communication device configured to exchange communications over a wireless data channel and a wireless voice channel. In some examples, the network module 314 can transmit alarm data over a wireless data channel and establish a two-way voice communication session over a wireless voice channel. The wireless communication device can include one or more of a LTE module, a GSM module, a radio modem, a cellular transmission module, or any type of module configured to exchange communications in any appropriate type of wireless or wired format.

The network module 314 can be a wired communication module configured to exchange communications over the network 305 using a wired connection. For instance, the network module 314 can be a modem, a network interface card, or another type of network interface device. The network module 314 can be an Ethernet network card configured to enable the control unit 310 to communicate over a local area network, the Internet, or a combination of both. The network module 314 can be a voice band modem configured to enable the alarm panel to communicate over the telephone lines of Plain Old Telephone Systems ("POTS").

The control unit system that includes the control unit 310 can include one or more sensors 320. For example, the environment 300 can include multiple sensors 320. The sensors 320 can include a lock sensor, a contact sensor, a motion sensor, a camera (e.g., a camera 330), a flow meter, any other type of sensor included in a control unit system, or a combination of two or more of these. The sensors 320 can include an environmental sensor, such as a temperature sensor, a water sensor, a rain sensor, a wind sensor, a light sensor, a smoke detector, a carbon monoxide detector, or an air quality sensor, to name a few additional examples. The sensors 320 can include a health monitoring sensor, such as a prescription bottle sensor that monitors taking of prescriptions, a blood pressure sensor, a blood sugar sensor, or a bed mat configured to sense presence of liquid (e.g., bodily fluids) on the bed mat. In some examples, the health monitoring sensor can be a wearable sensor that attaches to a person, e.g., a user, at the property. The health monitoring sensor can collect various health data, including pulse, heartrate, respiration rate, sugar or glucose level, bodily temperature, motion data, or a combination of these. The sensors 320 can include a radio-frequency identification ("RFID") sensor that identifies a particular article that includes a pre-assigned RFID tag.

The control unit 310 can communicate with a module 322 and a camera 330 to perform monitoring. The module 322 is connected to one or more devices that enable property automation, e.g., home or business automation. For instance, the module 322 can connect to, and be configured to control operation of, one or more lighting systems. The module 322 can connect to, and be configured to control operation of, one or more electronic locks, e.g., control Z-Wave locks using wireless communications in the Z-Wave protocol. In some examples, the module 322 can connect to, and be configured to control operation of, one or more appliances. The module 322 can include multiple sub-modules that are each specific to a type of device being controlled in an automated manner. The module 322 can control the one or more devices using commands received from the control unit 310. For instance, the module 322 can receive a command from the control unit 310, which command was sent using data captured by the camera 330 that depicts an area. In response, the module 322 can cause a lighting system to illuminate an area to provide better lighting in the area, and a higher likelihood that the camera 330 can capture a subsequent image of the area that depicts more accurate data of the area.

The camera 330 can be an image camera or other type of optical sensing device configured to capture one or more images. For instance, the camera 330 can be configured to capture images of an area within a property monitored by the control unit 310. The camera 330 can be configured to capture single, static images of the area; video of the area, e.g., a sequence of images; or a combination of both. The camera 330 can be controlled using commands received from the control unit 310 or another device in the property monitoring system, e.g., a device 350.

The camera 330 can be triggered using any appropriate techniques, can capture images continuous, or a combination of both. For instance, a Passive Infra-Red ("PIR") motion sensor can be built into the camera 330 and used to trigger the camera 330 to capture one or more images when motion is detected. The camera 330 can include a microwave motion sensor built into the camera which sensor is used to trigger the camera 330 to capture one or more images when motion is detected. The camera 330 can have a "normally open" or "normally closed" digital input that can trigger capture of one or more images when external sensors detect motion or other events. The external sensors can include another sensor from the sensors 320, PIR, or door or window sensors, to name a few examples. In some implementations, the camera 330 receives a command to capture an image, e.g., when external devices detect motion or another potential alarm event or in response to a request from a device. The camera 330 can receive the command from the controller 312, directly from one of the sensors 320, or a combination of both.

In some examples, the camera 330 triggers integrated or external illuminators to improve image quality when the scene is dark. Some examples of illuminators can include Infra-Red, Z-wave controlled "white" lights, lights controlled by the module 322, or a combination of these. An integrated or separate light sensor can be used to determine if illumination is desired and can result in increased image quality.

The camera 330 can be programmed with any combination of time schedule, day schedule, system "arming state", other variables, or a combination of these, to determine whether images should be captured when one or more triggers occur. The camera 330 can enter a low-power mode when not capturing images. In this case, the camera 330 can wake periodically to check for inbound messages from the controller 312 or another device. The camera 330 can be powered by internal, replaceable batteries, e.g., if located remotely from the control unit 310. The camera 330 can employ a small solar cell to recharge the battery when light is available. The camera 330 can be powered by a wired power supply, e.g., the controller's 312 power supply if the camera 330 is co-located with the controller 312.

In some implementations, the camera 330 communicates directly with the system 360 over the network 305. In these implementations, image data captured by the camera 330 need not pass through the control unit 310. The camera 330 can receive commands related to operation from the system 360, provide images to the system 360, or a combination of both.

The environment 300 can include one or more thermostats 334, e.g., to perform dynamic environmental control at the property. The thermostat 334 is configured to monitor temperature of the property, energy consumption of a heating, ventilation, and air conditioning ("HVAC") system associated with the thermostat 334, or both. In some examples, the thermostat 334 is configured to provide control of environmental (e.g., temperature) settings. In some implementations, the thermostat 334 can additionally or alternatively receive data relating to activity at a property; environmental data at a property, e.g., at various locations indoors or outdoors or both at the property; or a combination of both. The thermostat 334 can measure or estimate energy consumption of the HVAC system associated with the thermostat. The thermostat 334 can estimate energy consumption, for example, using data that indicates usage of one or more components of the HVAC system associated with the thermostat 334. The thermostat 334 can communicate various data, e.g., temperature, energy, or both, with the control unit 310. In some examples, the thermostat 334 can control the environmental, e.g., temperature, settings in response to commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In some examples, the control unit 310 can be a gateway device that communicates with the dynamically programmable thermostat 334. In some implementations, the thermostat 334 is controlled via one or more modules 322.

The environment 300 can include the HVAC system or otherwise be connected to the HVAC system. For instance, the environment 300 can include one or more HVAC modules 337. The HVAC modules 337 can be connected to one or more components of the HVAC system associated with a property. A HVAC module 337 can be configured to capture sensor data from, control operation of, or both, corresponding components of the HVAC system. In some implementations, the HVAC module 337 is configured to monitor energy consumption of an HVAC system component, for example, by directly measuring the energy consumption of the HVAC system components or by estimating the energy usage of the one or more HVAC system components by detecting usage of components of the HVAC system. The HVAC module 337 can communicate energy monitoring information, the state of the HVAC system components, or both, to the thermostat 334. The HVAC module 337 can control the one or more components of the HVAC system in response to receipt of commands received from the thermostat 334.

In some examples, the environment 300 includes one or more robotic devices 390. The robotic devices 390 can be any type of robots that are capable of moving, such as an aerial drone, a land-based robot, or a combination of both. The robotic devices 390 can take actions, such as capture sensor data or other actions that assist in security monitoring, property automation, or a combination of both. For example, the robotic devices 390 can include robots capable of moving throughout a property using automated navigation control technology, user input control provided by a user, or a combination of both. The robotic devices 390 can fly, roll, walk, or otherwise move about the property. The robotic devices 390 can include helicopter type devices (e.g., quad copters), rolling helicopter type devices (e.g., roller copter devices that can fly and roll along the ground, walls, or ceiling) and land vehicle type devices (e.g., automated cars that drive around a property). In some examples, the robotic devices 390 can be robotic devices 390 that are intended for other purposes and merely associated with the environment 300 for use in appropriate circumstances. For instance, a robotic vacuum cleaner device can be associated with the environment 300 as one of the robotic devices 390 and can be controlled to take action responsive to monitoring system events.

In some examples, the robotic devices 390 automatically navigate within a property. In these examples, the robotic devices 390 include sensors and control processors that guide movement of the robotic devices 390 within the property. For instance, the robotic devices 390 can navigate within the property using one or more cameras, one or more proximity sensors, one or more gyroscopes, one or more accelerometers, one or more magnetometers, a global positioning system ("GPS") unit, an altimeter, one or more sonar or laser sensors, any other types of sensors that aid in navigation about a space, or a combination of these. The robotic devices 390 can include control processors that process output from the various sensors and control the robotic devices 390 to move along a path that reaches the desired destination, avoids obstacles, or a combination of both. In this regard, the control processors detect walls or other obstacles in the property and guide movement of the robotic devices 390 in a manner that avoids the walls and other obstacles.

In some implementations, the robotic devices 390 can store data that describes attributes of the property. For instance, the robotic devices 390 can store a floorplan, a three-dimensional model of the property, or a combination of both, that enable the robotic devices 390 to navigate the property. During initial configuration, the robotic devices 390 can receive the data describing attributes of the property, determine a frame of reference to the data (e.g., a property or reference location in the property), and navigate the property using the frame of reference and the data describing attributes of the property. In some examples, initial configuration of the robotic devices 390 can include learning one or more navigation patterns in which a user provides input to control the robotic devices 390 to perform a specific navigation action (e.g., fly to an upstairs bedroom and spin around while capturing video and then return to a property charging base). In this regard, the robotic devices 390 can learn and store the navigation patterns such that the robotic devices 390 can automatically repeat the specific navigation actions upon a later request.

In some examples, the robotic devices 390 can include data capture devices. In these examples, the robotic devices 390 can include, as data capture devices, one or more cameras, one or more motion sensors, one or more microphones, one or more biometric data collection tools, one or more temperature sensors, one or more humidity sensors, one or more air flow sensors, any other type of sensor that can be useful in capturing monitoring data related to the property and users in the property, or a combination of these. The one or more biometric data collection tools can be configured to collect biometric samples of a person in the property with or without contact of the person. For instance, the biometric data collection tools can include a fingerprint scanner, a hair sample collection tool, a skin cell collection tool, or any other tool that allows the robotic devices 390 to take and store a biometric sample that can be used to identify the person (e.g., a biometric sample with DNA that can be used for DNA testing).

In some implementations, the robotic devices 390 can include output devices. In these implementations, the robotic devices 390 can include one or more displays, one or more speakers, any other type of output devices that allow the robotic devices 390 to communicate information, e.g., to a nearby user or another type of person, or a combination of these.

The robotic devices 390 can include a communication module that enables the robotic devices 390 to communicate with the control unit 310, each other, other devices, or a combination of these. The communication module can be a wireless communication module that allows the robotic devices 390 to communicate wirelessly. For instance, the communication module can be a Wi-Fi module that enables the robotic devices 390 to communicate over a local wireless network at the property. Other types of short-range wireless communication protocols, such as 900 MHz wireless communication, Bluetooth, Bluetooth LE, Z-wave, Zigbee, Matter, or any other appropriate type of wireless communication, can be used to allow the robotic devices 390 to communicate with other devices, e.g., in or off the property. In some implementations, the robotic devices 390 can communicate with each other or with other devices of the environment 300 through the network 305.

The robotic devices 390 can include processor and storage capabilities. The robotic devices 390 can include any one or more suitable processing devices that enable the robotic devices 390 to execute instructions, operate applications, perform the actions described throughout this specification, or a combination of these. In some examples, the robotic devices 390 can include solid-state electronic storage that enables the robotic devices 390 to store applications, configuration data, collected sensor data, any other type of information available to the robotic devices 390, or a combination of two or more of these.

The robotic devices 390 can process captured data locally, provide captured data to one or more other devices for processing, e.g., the control unit 310 or the system 360, or a combination of both. For instance, the robotic device 390 can provide the images to the control unit 310 for processing. In some examples, the robotic device 390 can process the images to determine an identification of the items.

One or more of the robotic devices 390 can be associated with one or more charging stations. The charging stations can be located at a predefined home base or reference location in the property. The robotic devices 390 can be configured to navigate to one of the charging stations after completion of one or more tasks needed to be performed, e.g., for the environment 300. For instance, after completion of a monitoring operation or upon instruction by the control unit 310, a robotic device 390 can be configured to automatically fly to and connect with, e.g., land on, one of the charging stations. In this regard, a robotic device 390 can automatically recharge one or more batteries included in the robotic device 390 so that the robotic device 390 is less likely to need recharging when the environment 300 requires use of the robotic device 390, e.g., absent other concerns for the robotic device 390.

The charging stations can be contact-based charging stations, wireless charging stations, or a combination of both. For contact-based charging stations, the robotic devices 390 can have readily accessible points of contact to which a robotic device 390 can contact on the charging station. For instance, a helicopter type robotic device can have an electronic contact on a portion of its landing gear that rests on and couples with an electronic pad of a charging station when the helicopter type robotic device lands on the charging station. The electronic contact on the robotic device 390 can include a cover that opens to expose the electronic contact when the robotic device is charging and closes to cover and insulate the electronic contact when the robotic device 390 is in operation.

For wireless charging stations, the robotic devices 390 can charge through a wireless exchange of power. In these instances, a robotic device 390 needs only position itself closely enough to a wireless charging station for the wireless exchange of power to occur. In this regard, the positioning needed to land at a predefined home base or reference location in the property can be less precise than with a contact-based charging station. Based on the robotic devices 390 landing at a wireless charging station, the wireless charging station can output a wireless signal that the robotic device 390 receives and converts to a power signal that charges a battery maintained on the robotic device 390. As described in this specification, a robotic device 390 landing or coupling with a charging station can include a robotic device 390 positioning itself within a threshold distance of a wireless charging station such that the robotic device 390 is able to charge its battery.

In some implementations, one or more of the robotic devices 390 has an assigned charging station. In these implementations, the number of robotic devices 390 can equal the number of charging stations. In these implementations, the robotic devices 390 can always navigate to the specific charging station assigned to that robotic device 390. For instance, a first robotic device can always use a first charging station and a second robotic device can always use a second charging station.

In some examples, the robotic devices 390 can share charging stations. For instance, the robotic devices 390 can use one or more community charging stations that are capable of charging multiple robotic devices 390, e.g., substantially concurrently or separately or a combination of both at different times. The community charging station can be configured to charge multiple robotic devices 390 at substantially the same time, e.g., the community charging station can begin charging a first robotic device and then, while charging the first robotic device, begin charging a second robotic device five minutes later. The community charging station can be configured to charge multiple robotic devices 390 in serial such that the multiple robotic devices 390 take turns charging and, when fully charged, return to a predefined home base or reference location or another location in the property that is not associated with a charging station. The number of community charging stations can be less than the number of robotic devices 390.

In some instances, the charging stations might not be assigned to specific robotic devices 390 and can be capable of charging any of the robotic devices 390. In this regard, the robotic devices 390 can use any suitable, unoccupied charging station when not in use, e.g., when not performing an operation for the environment 300. For instance, when one of the robotic devices 390 has completed an operation or is in need of battery charge, the control unit 310 can reference a stored table of the occupancy status of each charging station and instructs the robotic device to navigate to the nearest charging station that has at least one unoccupied charger.

The environment 300 can include one or more integrated security devices 380. The one or more integrated security devices can include any type of device used to provide alerts based on received sensor data. For instance, the one or more control units 310 can provide one or more alerts to the one or more integrated security input/output devices 380. In some examples, the one or more control units 310 can receive sensor data from the sensors 320 and determine whether to provide an alert, or a message to cause presentation of an alert, to the one or more integrated security input/output devices 380.

The sensors 320, the module 322, the camera 330, the thermostat 334, and the integrated security devices 380 can communicate with the controller 312 over communication links 324, 326, 328, 332, 338, 384, and 386. The communication links 324, 326, 328, 332, 338, 384, and 386 can be a wired or wireless data pathway configured to transmit signals between any combination of the sensors 320, the module 322, the camera 330, the thermostat 334, the robotic devices 390, the integrated security devices 380, or the controller 312. The sensors 320, the module 322, the camera 330, the thermostat 334, the robotic devices 390, and the integrated security devices 380 can continuously transmit sensed values to the controller 312, periodically transmit sensed values to the controller 312, or transmit sensed values to the controller 312 in response to a change in a sensed value, a request, or both. In some implementations, the robotic devices 390 can communicate with the system 360 over network 305. The robotic devices 390 can connect and communicate with the system 360 using a Wi-Fi or a cellular connection or any other appropriate type of connection.

The communication links 324, 326, 328, 332, 338, 384, and 386 can include any appropriate type of network, such as a local network. The sensors 320, the module 322, the camera 330, the thermostat 334, the robotic devices 390 and the integrated security devices 380, and the controller 312 can exchange data and commands over the network.

The system 360 can include one or more electronic devices, e.g., one or more computers. The system 360 is configured to provide monitoring services by exchanging electronic communications with the control unit 310, the one or more devices 340 and 350, the central alarm station server 370, or a combination of these, over the network 305. For example, the system 360 can be configured to monitor events (e.g., alarm events) generated by the control unit 310. In this example, the system 360 can exchange electronic communications with the network module 314 included in the control unit 310 to receive information regarding events (e.g., alerts) detected by the control unit 310. The system 360 can receive information regarding events (e.g., alerts) from the one or more devices 340 and 350.

In some implementations, the system 360 might be configured to provide one or more services other than monitoring services. In these implementations, the system 360 might perform one or more operations described in this specification without providing any monitoring services, e.g., the system 360 might not be a monitoring system as described in the example shown in FIG. 3.

In some examples, the system 360 can route alert data received from the network module 314 or the one or more devices 340 and 350 to the central alarm station server 370. For example, the system 360 can transmit the alert data to the central alarm station server 370 over the network 305.

The system 360 can store sensor and image data received from the environment 300 and perform analysis of sensor and image data received from the environment 300. Based on the analysis, the system 360 can communicate with and control aspects of the control unit 310 or the one or more devices 340 and 350.

The system 360 can provide various monitoring services to the environment 300. For example, the system 360 can analyze the sensor, image, and other data to determine an activity pattern of a person of the property monitored by the environment 300. In some implementations, the system 360 can analyze the data for alarm conditions or can determine and perform actions at the property by issuing commands to one or more components of the environment 300, possibly through the control unit 310.

The central alarm station server 370 is an electronic device, or multiple electronic devices, configured to provide alarm monitoring service by exchanging communications with the control unit 310, the one or more mobile devices 340 and 350, the system 360, or a combination of these, over the network 305. For example, the central alarm station server 370 can be configured to monitor alerting events generated by the control unit 310. In this example, the central alarm station server 370 can exchange communications with the network module 314 included in the control unit 310 to receive information regarding alerting events detected by the control unit 310. The central alarm station server 370 can receive information regarding alerting events from the one or more mobile devices 340 and 350, the system 360, or both.

The central alarm station server 370 is connected to multiple terminals 372 and 374. The terminals 372 and 374 can be used by operators to process alerting events. For example, the central alarm station server 370, e.g., as part of a first responder system, can route alerting data to the terminals 372 and 374 to enable an operator to process the alerting data. The terminals 372 and 374 can include general-purpose computers (e.g., desktop personal computers, workstations, or laptop computers) that are configured to receive alerting data from a computer in the central alarm station server 370 and render a display of information using the alerting data.

For instance, the controller 312 can control the network module 314 to transmit, to the central alarm station server 370, alerting data indicating that a sensor 320 detected motion from a motion sensor via the sensors 320. The central alarm station server 370 can receive the alerting data and route the alerting data to the terminal 372 for processing by an operator associated with the terminal 372. The terminal 372 can render a display to the operator that includes information associated with the alerting event (e.g., the lock sensor data, the motion sensor data, the contact sensor data, etc.) and the operator can handle the alerting event based on the displayed information. In some implementations, the terminals 372 and 374 can be mobile devices or devices designed for a specific function. Although FIG. 3 illustrates two terminals for brevity, actual implementations can include more (and, perhaps, many more) terminals.

The one or more devices 340 and 350 are devices that can present content, e.g., host and display user interfaces, audio data, or both. For instance, the mobile device 340 is a mobile device that hosts or runs one or more native applications (e.g., the smart property application 342). The mobile device 340 can be a cellular phone or a non-cellular locally networked device with a display. The mobile device 340 can include a cell phone, a smart phone, a tablet PC, a personal digital assistant ("PDA"), or any other portable device configured to communicate over a network and present information. The mobile device 340 can perform functions unrelated to the monitoring system, such as placing personal telephone calls, playing music, playing video, displaying pictures, browsing the Internet, and maintaining an electronic calendar.

The mobile device 340 can include a smart property application 342. The smart property application 342 refers to a software/firmware program running on the corresponding mobile device that enables the user interface and features described throughout. The mobile device 340 can load or install the smart property application 342 using data received over a network or data received from local media. The smart property application 342 enables the mobile device 340 to receive and process image and sensor data from the system 360.

The device 350 can be a general-purpose computer (e.g., a desktop personal computer, a workstation, or a laptop computer) that is configured to communicate with the system 360, the control unit 310, or both, over the network 305. The device 350 can be configured to display a smart property user interface 352 that is generated by the device 350 or generated by the system 360. For example, the device 350 can be configured to display a user interface (e.g., a web page) generated using data provided by the system 360 that enables a user to perceive images captured by the camera 330, reports related to the monitoring system, or both. Although FIG. 3 illustrates two devices for brevity, actual implementations can include more (and, perhaps, many more) or fewer devices.

In some implementations, the one or more devices 340 and 350 communicate with and receive data from the control unit 310 using the communication link 338. For instance, the one or more devices 340 and 350 can communicate with the control unit 310 using various wireless protocols, or wired protocols such as Ethernet and USB, to connect the one or more devices 340 and 350 to the control unit 310, e.g., local security and automation equipment. The one or more devices 340 and 350 can use a local network, a wide area network, or a combination of both, to communicate with other components in the environment 300. The one or more devices 340 and 350 can connect locally to the sensors and other devices in the environment 300.

Although the one or more devices 340 and 350 are shown as communicating with the control unit 310, the one or more devices 340 and 350 can communicate directly with the sensors and other devices controlled by the control unit 310. In some implementations, the one or more devices 340 and 350 replace the control unit 310 and perform one or more of the functions of the control unit 310 for local monitoring and long range, offsite, or both, communication.

In some implementations, the one or more devices 340 and 350 receive monitoring system data captured by the control unit 310 through the network 305. The one or more devices 340 and 350 can receive the data from the control unit 310 through the network 305, the system 360 can relay data received from the control unit 310 to the one or more devices 340 and 350 through the network 305, or a combination of both. In this regard, the system 360 can facilitate communication between the one or more devices 340 and 350 and various other components in the environment 300.

In some implementations, the one or more devices 340 and 350 can be configured to switch whether the one or more devices 340 and 350 communicate with the control unit 310 directly (e.g., through communication link 338) or through the system 360 (e.g., through network 305) based on a location of the one or more devices 340 and 350. For instance, when the one or more devices 340 and 350 are located close to, e.g., within a threshold distance of, the control unit 310 and in range to communicate directly with the control unit 310, the one or more devices 340 and 350 use direct communication. When the one or more devices 340 and 350 are located far from, e.g., outside the threshold distance of, the control unit 310 and not in range to communicate directly with the control unit 310, the one or more devices 340 and 350 use communication through the system 360.

Although the one or more devices 340 and 350 are shown as being connected to the network 305, in some implementations, the one or more devices 340 and 350 are not connected to the network 305. In these implementations, the one or more devices 340 and 350 communicate directly with one or more of the monitoring system components and no network (e.g., Internet) connection or reliance on remote servers is needed.

In some implementations, the one or more devices 340 and 350 are used in conjunction with only local sensors and/or local devices in a house. In these implementations, the environment 300 includes the one or more devices 340 and 350, the sensors 320, the module 322, the camera 330, and the robotic devices 390. The one or more devices 340 and 350 receive data directly from the sensors 320, the module 322, the camera 330, the robotic devices 390, or a combination of these, and send data directly to the sensors 320, the module 322, the camera 330, the robotic devices 390, or a combination of these. The one or more devices 340 and 350 can provide the appropriate interface, processing, or both, to provide visual surveillance and reporting using data received from the various other components.

In some implementations, the environment 300 includes network 305 and the sensors 320, the module 322, the camera 330, the thermostat 334, and the robotic devices 390 are configured to communicate sensor and image data to the one or more devices 340 and 350 over network 305. In some implementations, the sensors 320, the module 322, the camera 330, the thermostat 334, and the robotic devices 390 are programmed, e.g., intelligent enough, to change the communication pathway from a direct local pathway when the one or more devices 340 and 350 are in close physical proximity to the sensors 320, the module 322, the camera 330, the thermostat 334, the robotic devices 390, or a combination of these, to a pathway over network 305 when the one or more devices 340 and 350 are farther from the sensors 320, the module 322, the camera 330, the thermostat 334, the robotic devices 390, or a combination of these.

In some examples, the system 360 leverages GPS information from the one or more devices 340 and 350 to determine whether the one or more devices 340 and 350 are close enough to the sensors 320, the module 322, the camera 330, the thermostat 334, the robotic devices 390, or a combination of these, to use the direct local pathway or whether the one or more devices 340 and 350 are far enough from the sensors 320, the module 322, the camera 330, the thermostat 334, the robotic devices 390, or a combination of these, that the pathway over network 305 is required. In some examples, the system 360 leverages status communications (e.g., pinging) between the one or more devices 340 and 350 and the sensors 320, the module 322, the camera 330, the thermostat 334, the robotic devices 390, or a combination of these, to determine whether communication using the direct local pathway is possible. If communication using the direct local pathway is possible, the one or more devices 340 and 350 communicate with the sensors 320, the module 322, the camera 330, the thermostat 334, the robotic devices 390, or a combination of these, using the direct local pathway. If communication using the direct local pathway is not possible, the one or more devices 340 and 350 communicate with the sensors 320, the module 322, the camera 330, the thermostat 334, the robotic devices 390, or a combination of these, using the pathway over network 305.

In some implementations, the environment 300 provides people with access to images captured by the camera 330 to aid in decision-making. The environment 300 can transmit the images captured by the camera 330 over a network, e.g., a wireless WAN, to the devices 340 and 350. Because transmission over a network can be relatively expensive, the environment 300 can use several techniques to reduce costs while providing access to significant levels of useful visual information (e.g., compressing data, down-sampling data, sending data only over inexpensive LAN connections, or other techniques).

In some implementations, a state of the environment 300, one or more components in the environment 300, and other events sensed by a component in the environment 300 can be used to enable/disable video/image recording devices (e.g., the camera 330). In these implementations, the camera 330 can be set to capture images on a periodic basis when the alarm system is armed in an "away" state, set not to capture images when the alarm system is armed in a "stay" state or disarmed, or a combination of both. In some examples, the camera 330 can be triggered to begin capturing images when the control unit 310 detects an event, such as an alarm event, a door-opening event for a door that leads to an area within a field of view of the camera 330, or motion in the area within the field of view of the camera 330. In some implementations, the camera 330 can capture images continuously, but the captured images can be stored or transmitted over a network when needed.

Although FIG. 3 depicts the system 360 as remote from the control unit 310, in some examples the control unit 310 can be a component of the system 360. For instance, both the system 360 and the control unit 310 can be physically located at a property that includes the sensors 320 or at a location outside the property.

In some examples, some of the sensors 320, the robotic devices 390, or a combination of both, might not be directly associated with the property. For instance, a sensor or a robotic device might be located at an adjacent property or on a vehicle that passes by the property. A system at the adjacent property or for the vehicle, e.g., that is in communication with the vehicle or the robotic device, can provide data from that sensor or robotic device to the control unit 310, the system 360, or a combination of both.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. A computer-implemented method comprising:

determining, by a first device and using network radio data from a network radio for the first device that was connected to a second device using the network radio, that the first device is disconnected from the second device;

in response to determining that the first device is disconnected from the second device using the network radio, receiving, by the first device and from a third, different device, configuration data i) for the first device ii) that indicates changes to data on the first device to cause the first device to increase a likelihood of regaining connectivity with the second device using the network radio; and causing, using the configuration data, the first device to change the data on the first device to increase the likelihood of regaining connectivity with the second device using the network radio, wherein the causing comprises changing, by the first device, the data to increase the likelihood of regaining connectivity with the second device using the network radio.

2. The method of claim 1, comprising determining, among multiple causes, a likely cause of the first device losing connectivity to the second device using the network radio, wherein the configuration data is determined using data for the likely cause of the first device losing connectivity to the second device using the network radio.

3. The method of claim 1, comprising maintaining, for the first device, firmware data that indicates one or more operations for the first device to perform to increase a likelihood of regaining connectivity with the second device, wherein determining the configuration data uses the firmware data.

4. The method of claim 1, comprising:

after using the configuration data to cause the first device to change the data on the first device, determining a connection status between the first device and the second device; and performing one or more additional operations using the connection status between the first device and the second device.

5. The method of claim 4, comprising receiving further configuration data with instructions for generating a message for display in a user interface on the first device, wherein the connection status indicates that the first device and the second device are still disconnected.

6. The method of claim 5, wherein performing the one or more additional operations comprises:

storing, in a database that tracks connection status for various network communication protocols and a plurality of devices, the connection status that indicates a corresponding network communication protocol for the connection between the first device and the second device; and sending, to the plurality of devices that connect with the second device using the corresponding network communication protocol and using data from the database, a network connectivity message.

7. The method of claim 1, comprising:

sending, to a third device, the configuration data that caused the first device to change the data to cause the third device to perform an operation using the configuration data.

8. The method of claim 1, wherein determining that the first device is disconnected from the second device comprises determining that the first device is unable to send signals to or receive signals from the second device over the network radio.

9. The method of claim 1, wherein determining that the first device is disconnected from the second device uses a cross protocol communication mode with the network radio.

10. A system comprising one or more computers and one or more storage devices on which are stored instructions that are operable, when executed by the one or more computers, to cause the one or more computers to perform operations comprising:

determining, using network radio data from a network radio for a first device that was connected to a second device using the network radio, that the first device is disconnected from the second device, wherein determining that the first device is disconnected from the second device using the network radio comprises receiving, from the first device and by one or more computers, a message that indicates that the first device is disconnected from the second device using the network radio;

in response to determining that the first device is disconnected from the second device using the network radio, determining configuration data i) for the first device ii) that indicates changes to data on the first device to cause the first device to increase a likelihood of regaining connectivity with the second device using the network radio; and causing, using the configuration data, the first device to change the data on the first device to increase the likelihood of regaining connectivity with the second device using the network radio, wherein the causing comprises sending, to the first device, the configuration data to cause the first device to change the data to increase the likelihood of regaining connectivity with the second device using the network radio.

11. The system of claim 10, wherein determining that the first device is disconnected from the second device using the network radio comprises receiving, from the first device and by the one or more computers, a message that indicates that the first device is disconnected from the second device using the network radio.

12. The system of claim 10, wherein the operations comprise:

sending, to the first device and using a communication protocol for which the network radio is configured, a ping, wherein:

determining that the first device is disconnected from the second device using the network radio comprises determining that the first device has not responded to the ping within a threshold time period; and causing the first device to change using the configuration data comprises sending, to the first device, the configuration data to cause the first device to change the data to increase the likelihood of regaining connectivity with the second device using the network radio.

13. The system of claim 12, wherein sending the ping comprises sending the ping according to a predetermined schedule.

14. The system of claim 10, wherein the operations comprise determining, among multiple causes, a likely cause of the first device losing connectivity to the second device using the network radio, wherein determining the configuration data uses data for the likely cause of the first device losing connectivity to the second device using the network radio.

15. The system of claim 10, wherein the operations comprise maintaining, for the first device, firmware data that indicates one or more operations for the first device to perform to increase a likelihood of regaining connectivity with the second device, wherein determining the configuration data uses the firmware data.

16. The system of claim 10, wherein the operations comprise:

after using the configuration data to cause the first device to change the data on the first device, determining a connection status between the first device and the second device; and performing one or more additional operations using the connection status between the first device and the second device.

17. The system of claim 16, wherein the operations comprise sending further configuration data with instructions for generating a message for display in a user interface on the first device, wherein the connection status indicates that the first device and the second devices are still disconnected.

18. The system of claim 16, wherein performing the one or more additional operations comprises:

storing, in a database that tracks connection status for various network communication protocols and a plurality of devices, the connection status that indicates a corresponding network communication protocol for the connection between the first device and the second device; and sending, to the plurality of devices that connect with the second device using the corresponding network communication protocol and using data from the database, a network connectivity message.

19. The system of claim 16, wherein the operations comprise:

sending, to a third device, the configuration data that caused the first device to change the data to cause the third device to perform an operation using the configuration data.

20. The system of claim 16, wherein determining that the first device is disconnected from the second device comprises determining that the first device is unable to send signals to or receive signals from the second device over the network radio.

21. One or more computer storage media encoded with instructions that, when executed by one or more computers, cause the one or more computers to perform operations comprising:

determining, using network radio data for a first device that a) has a network radio and b) was connected to a second device using the network radio, that the first device is disconnected from the second device using the network radio, wherein determining that the first device is disconnected from the second device using the network radio comprises receiving, from the first device and by one or more computers, a message that indicates that the first device is disconnected from the second device using the network radio;

in response to determining that the first device is disconnected from the second device using the network radio, determining configuration data i) for the first device ii) that indicates changes to data on the first device to cause the first device to increase a likelihood of regaining connectivity with the second device using the network radio; and causing, using the configuration data, the first device to change the data on the first device to increase the likelihood of regaining connectivity with the second device using the network radio, wherein the causing comprises sending, to the first device, the configuration data to cause the first device to change the data to increase the likelihood of regaining connectivity with the second device using the network radio.

* * * * *